United States Patent

[11] 3,597,936

| [72] | Inventors | Eddie L. Dyre;<br>John A. Greacen, both of Syracuse, N.Y. |
|---|---|---|
| [21] | Appl. No. | 865,812 |
| [22] | Filed | Oct. 13, 1969 |
| [45] | Patented | Aug. 10, 1971 |
| [73] | Assignee | Carrier Corporation<br>Syracuse, N.Y. |

[54] PURGE SYSTEM FOR LITHIUM BROMIDE ABSORPTION WATER CHILLER
4 Claims, 1 Drawing Fig.

| [52] | U.S. Cl. | 62/474,<br>62/475, 62/476 |
|---|---|---|
| [51] | Int. Cl. | F25b 15/06 |
| [50] | Field of Search | 62/195,<br>474, 475, 476, 85 |

[56] References Cited
UNITED STATES PATENTS

| 3,146,602 | 9/1964 | Swearingen | 62/475 X |
| 3,187,515 | 6/1965 | Swearingen | 62/474 X |
| 3,367,134 | 2/1968 | Bourne | 62/475 |
| 3,367,135 | 2/1968 | Greacen et al. | 62/475 |

*Primary Examiner*—William F. O'Dea
*Assistant Examiner*—P. D. Ferguson
*Attorneys*—Harry G. Martin, Jr. and J. Raymond Curtin

ABSTRACT: Solution is pumped from the low-pressure side of the system for operating a jet eductor which functions to entrain noncondensable gases in the low-pressure side in the solution passing through the eductor. The solution and entrained gases are discharged from the eductor into a passage means operable to separate the gases from the solution and discharge the gases into the high-pressure side. Purge means is connected to the high-pressure side for venting the gases to the atmosphere.

Patented Aug. 10, 1971
3,597,936
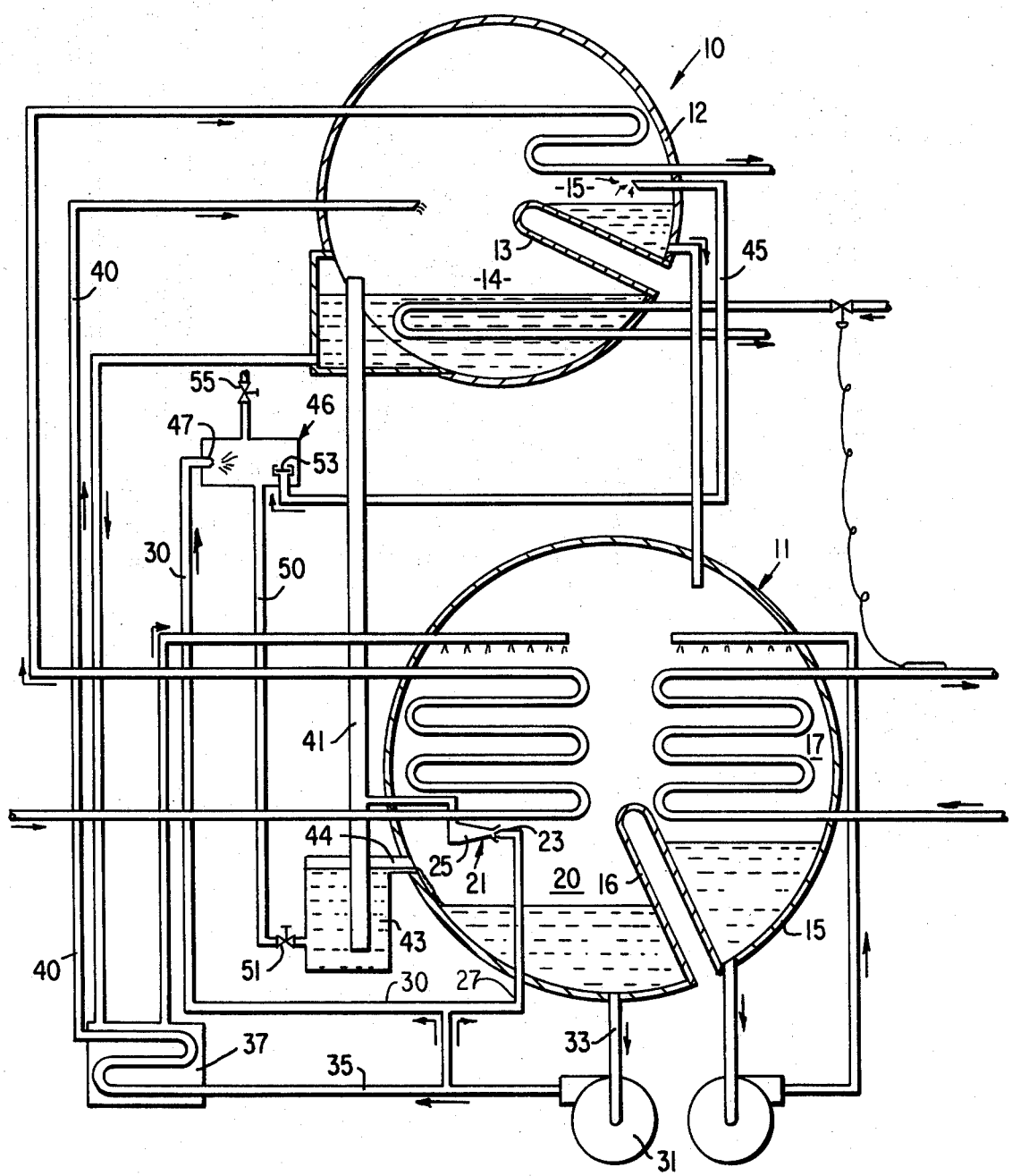
INVENTORS.
EDDIE L. DYRE.
JOHN A. GREACEN.
BY
D. Emmett Thompson
ATTORNEY.

PURGE SYSTEM FOR LITHIUM BROMIDE ABSORPTION WATER CHILLER

BACKGROUND OF THE INVENTION

It is well known that gases are generated within a lithium bromide absorption water chiller by chemical reactions involving the absorbent solution lithium bromide, the refrigerant water, and the various materials of construction. It is believed that said reactions are influenced by absorbent temperature, favoring gas production at elevated temperature, as in the high-pressure side. Additional gases may also be introduced by atmospheric leakage into the unit. The term "gases" is here understood to mean gases or vapors which are negligibly condensable or soluble in liquids at the temperatures and pressures occurring within said water chiller.

It is also well known that the presence of said gases adversely affects the performance of said water chiller, so that purge means for expelling said gases are commonly applied to water chillers employing the combination of lithium bromide absorbent and water refrigerant. A number of purging arrangements have been devised and are well known to those practiced in the art.

The relatively noncondensable nature of said gases causes them to accumulate among the heat exchange tubes of the refrigerant condenser section of said water chiller. The observed effect of said accumulation is to reduce the maximum capacity of said water chiller.

The relative insolubility of said gases causes them to also accumulate among the heat exchange tubes of the absorber section of said water chiller. The outward manifestation of said accumulation is an undesirable increase in absorbent concentration.

In view of the foregoing, a desirable feature of a purge means is the capability for continuously removing gases from both the absorber and condenser. Furthermore, inasmuch as the major portion of the gas is believed to originate in the high-pressure portion of the system, it is desirable to prevent the escape of gases therefrom to the low-pressure side, as by means of a liquid trap in the refrigerant condensate drain. The low-pressure side, including absorber pressure, is typically one-tenth of the high-pressure side including condenser pressure. As a result, and inasmuch as relatively little gas is believed to originate in the low-pressure side, the quantity of gases removed from the absorber is believed to be a small fraction of the quantity of gases removed from the condenser. It is therefore believed that the gases removed from the absorber can be transferred to the high-pressure side of the system and subsequently be removed therefrom by a condenser purge means, without adversely affecting the performance of the condenser. Such is the object of this invention.

SUMMARY OF THE INVENTION

The purge system of our invention utilizes a solution jet eductor for the removal of noncondensable gases from the absorber. The eductor is powered by solution pumped from the low side of the system. The solution is directed from the jet of the eductor into a conical diffuser wherein it is decelerated to achieve a pressure sufficient to inject the solution with the gases entrained therein into a passage means extending to the high-pressure side of the system. The passage means is vertically disposed and preferably communicates with the generator section of the high-pressure side. Preferably, the eductor is located in the absorber section of the low-pressure side. The passage means is operable to effect separation of the solution from the entrained vapor and gases whereby the gases pass into the high-pressure side of the system and the solution gravitates to a liquid trap connected to the lower end of the passage means and which has a return to the absorber. A purge means, which may be of conventional form, is connected to the high-pressure side for the removal of the noncondensable gases therefrom. To the end of economy, the passage means may consist of the overflow pipe from the generator section, and the solution for powering the eductor may be taken from a branch circuit connected to the discharge side of the generator pump.

DESCRIPTION OF THE PREFERRED EMBODIMENT

In making reference to the schematic drawing depicting an absorption system, 10 designates the high-pressure side of the system consisting of a shell 12 having a partial partition 13 defining a generator section 14 and a condenser section 15.

The low-pressure side 11 is contained in a shell 15 having a partial partition 16 defining an evaporator section 17 and an absorption section 20. An eductor 21 consisting of a jet 23 and a conical diffuser 25 is associated with the absorber section 20. The eductor is powered by solution taken from the low-pressure side 11. As shown in the drawing, the jet 23 is connected by a conduit 27 to a branch circuit 30 extending from the discharge side of a pump 31. The intake side of the pump is connected by conduit 33 to the sump of the absorber containing dilute absorbent solution.

The pump 31 is conventionally referred to as the generator pump and serves to pass dilute absorbent solution through discharge line 35, heat exchanger 37, line 40, to the generator section 14.

The solution under pressure is discharged from the jet 23 to the conical diffuser 25, wherein the solution is decelerated and a pressure is achieved to discharge the solution into a passage means shown as a vertically disposed generator overflow conduit 41 having its upper end communicating with the generator section 14. In operation, the eductor 21 functions to entrain vapor and noncondensable gases from the absorber 20. The lower end of the conduit 41 is connected to a liquid trap 43 having a discharge 44 communicating with the absorber 20. With this arrangement, the solution gravitates into the trap 43 while the entrained vapor and gases ascend upwardly in conduit 41 and are discharged into the generator 14. In the drawing, the conduit 41 is illustrated as the overflow pipe from the generator 14 which serves to define the maximum solution level in the generator in the event that the strong solution passage becomes blocked.

Inasmuch as the generator and condenser sections are in communication, the vapor and noncondensable gases extracted from the absorber pass to the generator section 14 and thence to the condenser section 15 which is provided with a purge arrangement. The purge arrangement illustrated is of conventional form consisting of conduit 45 extending from the condenser section to an isolation chamber 46. A jet nozzle 47 is mounted in the chamber 46 and is connected to the branch circuit 30 from pump 31. The solution sprayed from the nozzle 47 absorbs vapor conducted from the condenser 15 through line 45. The solution from nozzle 47 and absorbed vapor drain through conduit 50 to the trap 43 for return to the absorber. Upon closure of valve 51 in line 50, solution from nozzle 47 accumulates in the isolation chamber due to the action of check valve 53 at the discharge end of line 45. The accumulated noncondensable gases in the isolation chamber 46 may then be vented to atmosphere by opening valve 55. The valve 55 may be operated manually or automatically.

We claim:

1. In an absorption refrigeration system of the type having a high-pressure side comprising a generator section and a condenser section in communication with said generator section, and a low-pressure side comprising an evaporator section and an absorber section in communication with said evaporator section, a liquid jet eductor, a pump for pumping solution from said low-pressure side to said eductor for operating the same, a discharge passage means communicating at its upper end with said high-pressure side, said discharge passage means communicating at its lower end with a liquid trap having a return line extending to said absorber section, said eductor having a discharge line connected to said discharge passage means intermediate the ends thereof, said eductor being operable to draw relatively noncondensable gases from said low-pressure side by entrainment in the solution passing through said eductor and transmit the same to said discharge passage means, said discharge passage means serving to effect separation of said relatively noncondensable gases from said solution for collection of said solution in said trap and to discharge said relatively noncondensable gases directly to said high-pressure side, a purge system connected to said high-pressure side and operable to draw said relatively noncondensable gases therefrom and to vent said gases to the atmosphere.

2. A system as set forth in claim 1 wherein said discharge passage means comprises a vertically disposed tube descending from said generator section and communicating at its lower end with said liquid trap whereby said solution gravitates to said trap and said relatively noncondensable gases ascend to said generator section.

3. A system as defined in claim 2 wherein said tube comprises an overflow pipe communicating with said generator section at a location such as to establish a maximum solution level in said generator section.

4. An absorption refrigeration system according to claim 1 wherein said pump has a suction line connected to said absorber section and a discharge line extending to said generator section for the transfer of weak absorbent solution from said absorber section to said generator section, a branch line extending from said discharge line to said eductor for conveying weak solution to said eductor for operation thereof.